United States Patent
Gallo et al.

(10) Patent No.: US 9,262,711 B2
(45) Date of Patent: Feb. 16, 2016

(54) NFC TAG, COMMUNICATION METHOD AND SYSTEM

(71) Applicant: NXP B.V., Eindhoven (NL)

(72) Inventors: Francesco Gallo, Graz (AT); Paul Bakker, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/507,773

(22) Filed: Oct. 6, 2014

(65) Prior Publication Data

US 2015/0097030 A1    Apr. 9, 2015

(30) Foreign Application Priority Data

Oct. 7, 2013  (EP) .................................... 13187607

(51) Int. Cl.
| | | |
|---|---|---|
| G06K 7/00 | (2006.01) | |
| G06K 19/073 | (2006.01) | |
| G06K 19/07 | (2006.01) | |
| H04B 5/00 | (2006.01) | |
| H04M 1/725 | (2006.01) | |

(52) U.S. Cl.
CPC .......... *G06K 19/073* (2013.01); *G06K 19/0712* (2013.01); *G06K 19/0723* (2013.01); *H04B 5/0031* (2013.01); *H04M 1/7253* (2013.01); *H04M 2250/04* (2013.01)

(58) Field of Classification Search
USPC ................... 235/439, 487, 375, 380, 451, 492
See application file for complete search history.

(56) References Cited

U.S. PATENT DOCUMENTS

| | | |
|---|---|---|
| 2014/0062661 A1 | 3/2014 | Gallo et al. |
| 2014/0074722 A1* | 3/2014 | Abel ................. G06Q 20/3278 705/71 |

FOREIGN PATENT DOCUMENTS

| | | |
|---|---|---|
| EP | 2 582 160 A1 | 4/2003 |
| WO | 2009/044228 A2 | 4/2009 |

OTHER PUBLICATIONS

Extended European Search Report for Patent Appln. No. 13187607.0 (Feb. 7, 2014).
"NFC Data Exchange Format (NDEF) Technical Specification, NDEF 1.0", NFC Forum, 25 pgs, retrieved from the internet at: www.eet-china.com/ARTICLES/2006AUG/.../NFCForum-TS-NDEF.pdf. (Jul. 24, 2006).
"Type 1 Tag Operation Specification, Technical Specification, T1TOP 1.1", NFC Forum, 47 pgs, retrieved from the internet at: apps4android.org/nfc-specifications/NFCForum-TS-Type-1-Tag_1.1.pdf (Apr. 13, 2011).
"Type 2 Tag Operation Specification, Technical Specification, T2TOP 1.1", NFC Forum, 53 pgs, retrieved from the internet at: apps4android.org/nfc-specifications/NFCForum-TS-Type-2-Tag_1.1.pdf (May 31, 2011).

(Continued)

*Primary Examiner* — Edwyn Labaze

(57) ABSTRACT

A near field communication tag (101), comprises a first tag interface (107) for wireless near field communication with a first device (105), a second tag interface (113) for wired communication with a second device (103), a field detection section (119) for detecting a near field (109) for the wireless near field communication, a pin (121) connectable to the second device (103), wherein an output signal (127) is determined based on a result of the detecting of a near field (109) and the output signal (127) is provided to the pin (121), and an electronic storage (125) storing pin configuration information specifying the output signal.

15 Claims, 1 Drawing Sheet

(56) References Cited

OTHER PUBLICATIONS

"Type 3 Tag Operation Specification, Technical Specification, T3TOP 1.1", NFC Forum, 33 pgs, retrieved from the internet at: apps4android.org/nfc-specifications/NFCForum-TS-Type-3-Tag_1.1.pdf (Jun. 28, 2011).

"Type 4 Tag Operation, Technical Specification, T4TOP 2.0", NFC Forum, 38 pgs, retrieved from the internet at: apps4android.org/nfc-specifications/NFCForum-TS-Type-4-Tag_2.0.pdf (Nov. 18, 2010).

"Connection Handover, Technical Specification, Connection Handover 1.2", NFC Forum, 27 pgs, retrieved from the internet at: www.cardsys.dk/.../NFC/.../NFC%20Connection%20Handover%201.2%2 (Jun. 28, 2011).

Bluetooth Secure Simple Pairing Using NFC, NFCForum-AD-BTSSP_1.0, NFC Forum, 32 pgs, retrieved from the internet at: members.nfc-forum.org/.../AppDocs/NFCForum_AD_BTSSP_1_0.pdf (Oct. 18, 2011).

"ISO14443-3, International cards—Contactless Integrated Circuit Cards—Proximity Cards, Part 3: Initialization and Anticollision", ISO/IEC, 70 pgs, retrieved from the internet at: http://www.iso.org/iso/catalogue_detail.htm?csnumber=50942 (Apr. 15, 2011).

\* cited by examiner

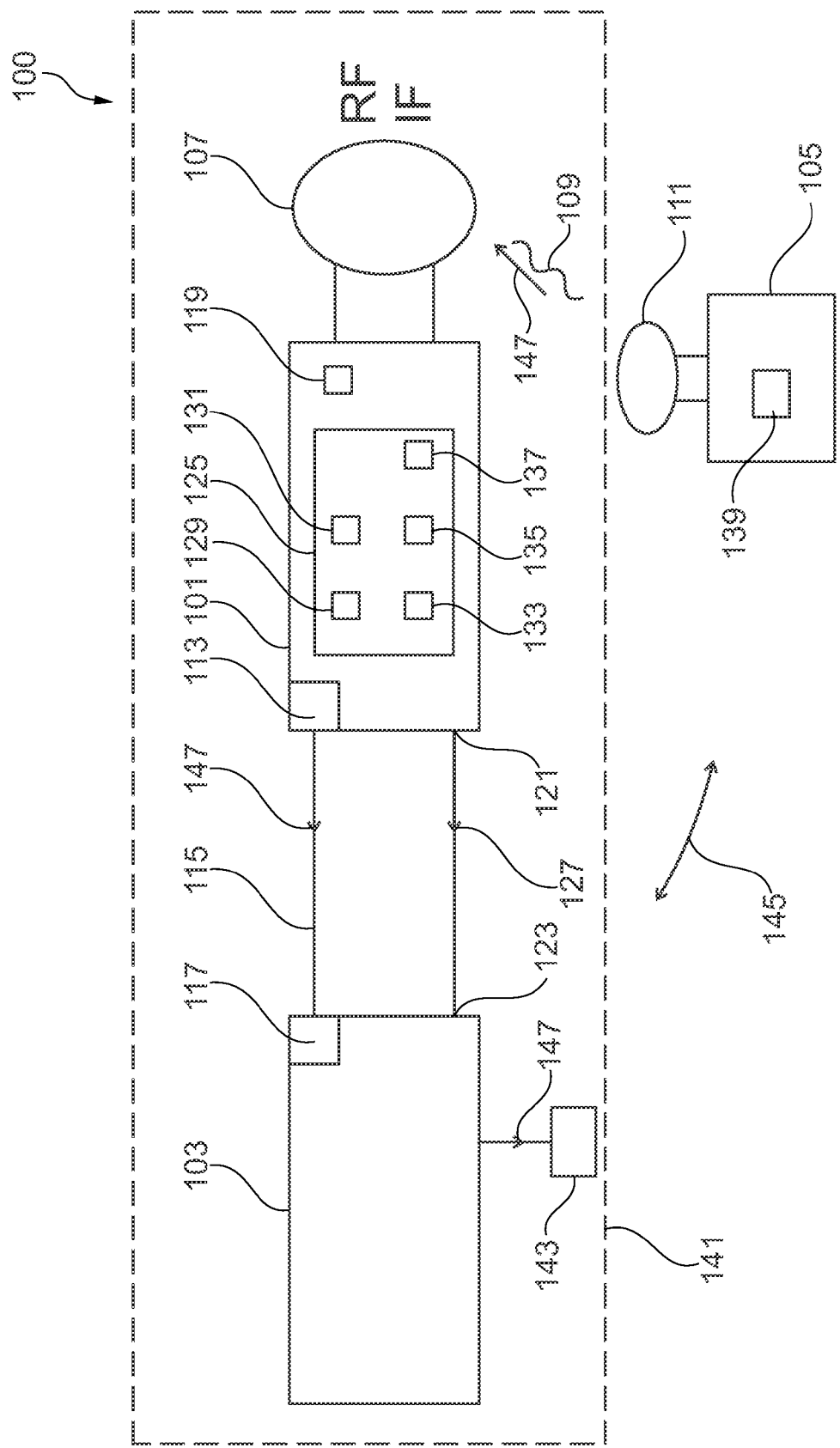

NFC TAG, COMMUNICATION METHOD AND SYSTEM

CROSS-REFERENCE TO RELATED APPLICATIONS

This application claims the priority under 35 U.S.C. §119 of European patent application no. 13187607.0, filed on Oct. 7, 2013, the contents of which are incorporated by reference herein.

FIELD OF THE INVENTION

The present invention relates to a near field communication tag, to a device having a wire-based communication interface for communication with the near field communication tag, to a communication system comprising the near field communication tag and at least the device having the wire-based communication interface and to a method performed by the communication system which further includes another device having a near field communication interface.

BACKGROUND OF THE INVENTION

Identification products such as smart cards and RFID (Radio Frequency IDentification) tags may be used widely in fields such as transport (ticketing, road tolling, baggage tagging), finance (debit and credit cards, electronic purse, merchant card), communications (SIM card for GSM phone), and tracking (access control, inventory management, asset tracking) International standard ISO14443A is the industry standard for contactless smart cards. ISO14443A-compliant products such as MIFARE™ (see for example www.semiconductors.philips.com/markets/identification/products/mifare/index.html#applications) provide RF communication technology for transmitting data between a card or tag and a reader device. For example, in electronic ticketing for public transport, travelers just wave their card over a reader at the turnstiles or entry point, benefiting from improved convenience and speed in the ticketing process. Such products are set to be the key to individual mobility in the future, supporting multiple applications including road tolling, airline tickets, access control and many more.

Evolving from a combination of contactless identification and networking technologies, Near Field Communication (NFC) (see for example www.nfc-forum.org) is a very short-range wireless technology, for distances measured in centimeters, and is optimized for intuitive, easy and secure communications between various devices without user configuration. In order to make two devices communicate, users bring them close together or even make them touch. The devices' NFC interfaces will automatically connect and configure themselves to form a peer-to-peer network. NFC can also bootstrap other protocols like Bluetooth™ or Wireless Ethernet (WiFi) by exchanging the configuration and session data. NFC is compatible with contactless smart card platforms. This enables NFC devices to read information from these cards, making contactless smart cards the ideal solution for bringing information and vouchers into the NFC world. NFC devices can also operate like a contactless card making them compatible with the huge installed infrastructure of ISO14443A-compliant systems. This functionality is called card emulation. Secure NFC combines NFC applications with smart card security. Devices with secure NFC act like a contactless smart card with cryptographic capabilities. This means that confidential data, and data that represents values, is stored in a secure memory area and always stays on the card. Authentication is performed by the NFC device itself and transmitted data can be encrypted by the NFC device using a private encryption key stored in the device's secure memory.

The Near Field Communication (NFC) Forum is a non-profit industry association founded by Nokia Corporation, Royal Philips Electronics and Sony Corporation to advance the use of NFC short-range wireless interaction in consumer electronics, mobile devices and PCs. The NFC Forum will promote implementation and standardization of NFC technology to ensure interoperability between devices and services.

A near field communication tag having an additional interface for wire-based communication (also referred to as wired interface) may be known for accessories or devices to speed up or to make more secure the connection handover use case based on for example Bluetooth or WiFi technologies. In this use case, the NFC tag may be connected to a host using a wired interface and may further be communicating with a reader device using NFC. It may be desired to transfer data, such as configuration data, for configuring a Bluetooth communication, from the reader device to the NFC tag and from there to the host, wherein the transfer from the NFC tag to the host may be wire-based using the wired interface. Thereby, the host may be installed in an appliance, such as a printer or a desktop computer, which may require receiving configuration information for configuring the Bluetooth connection to the reader device. In other use cases, the configuration data may for example be utilized to configure the printer or any other device for proper operation.

There may be a need for a NFC tag, a host device (second device), a communication system and a method performed by the communication system in which an interplay between the NFC tag, the second device and also a first device is improved, in particular regarding required time and complexity.

OBJECT AND SUMMARY OF THE INVENTION

According to an embodiment of the present invention, it is provided a near field communication tag, comprising a first tag interface for wireless near field communication with a first device (e.g. a reader); a second tag interface for wired communication with a second device (e.g. a host); a field detection section for detecting a near field for the wireless near field communication; a pin connectable to the second device, wherein an output signal is determined based on a result of the detecting of a near field and the output signal is provided to the pin; and an electronic storage storing pin configuration information specifying the output signal.

The near field communication tag (NFC tag or simply referred to as tag) may itself be a passive tag, i.e. having no own energy supply. The NFC tag may be powered by a near field received from the first device (also referred to as reader device or simply reader or RF reader). Alternatively or additionally, the NFC tag may receive electric energy from the second device (also referred to as host or host device). In particular, the NFC tag may have a fixed connection to the second device, wherein this fixed connection may be represented by a communication wire for enabling the wired communication, such as I2C. In particular, the near field communication tag may be, together with the second device, installed in an appliance, such as a printer, a desktop computer, etc.

The near field communication may be compliant with ISO/IEC 14443A. The first tag interface may have a receiving section for receiving a near field, a decoding section for decoding the received near field to recognizable data, and a transmission section for transmitting a near field or at least modifying a near field which is produced by a reader device, such as the first device. The second tag interface may for example be compliant with I2C. The field detection section may detect a near field by induction of a voltage in a coil. The pin may be embodied as a terminal which may be accessible from outside the near field communication tag which may electrically be connectable to the second device. The output signal supplied or provided to the pin may be coded in any feasible manner. The output signal may be determined based on the presence or absence of a near field or based on a transition between an absence and a presence or a presence and an absence of a near field. Further, the output signal may be dependent on a state of the near field communication tag, such as a state related to a near field communication with the first device. The electronic storage may at least be partially accessible (readable and/or writable) via the first tag interface and/or the second tag interface. Other portions of the electronic storage may not be accessible via either the first tag interface or the second tag interface. Even other portions may only be accessible for read via the first tag interface or the second tag interface.

The pin configuration information may allow to "program" the pin in the sense that it may be programmed or configurable what value the output signal takes or what the output signal is intended to indicate to the second device depending on the presence/absence of the near field or the transition of the near field from presence to absence or absence to presence (and potentially also further depending on other properties, such as a state of the near field communication tag).

The pin which may be connected to the second device may thus be used to supply the output signal to the second device such that the second device may be notified or may acquire the output signal and may then perform one or more actions depending on the received output signal. For example, the second device may, via the output signal, be informed that the NFC tag initiated a near field communication with a first device or that the near field communication tag has already received some first device data from the first device. Via the second tag interface, the near field communication tag may then transfer the first device data to the second device or the second device may request the first device data via a wired communication path involving the second tag interface. The second device may further on receive the first device data and perform then one or more actions depending on the first device data. Thereby, the output signal previously received via the pin of the near field communication tag may for example inform the second device that a near field communication between the near field communication tag and the first device is ongoing. After a particular delay or after a particular time interval has exceeded, the second device may then request or read first device data expected to have been received at the near field communication tag. According to an embodiment of the present invention, the second device may repeat requesting the first device data, if at the first request for the first device data, the first device data are not yet received at the near field communication tag. In particular, the second device may continue to request or try to read the first device data from the near field communication tag until reading the first device data was successful. Alternatively or additionally, the near field communication tag may also inform the second device that reading or obtaining the first device data from the first device at the NFC tag has been completed.

The second device may later on use the first device data (originally coming from the first device) which are read from the near field communication tag, to configure or adapt an appliance, in particular regarding another communication session, such as involving Bluetooth or WiFi which may then be established with the first device, however using a communication technology which may be different from a near field communication technology. Thereby, a handover from a near field communication between the near field communication tag and the first device to another communication between the first device and an appliance in which the near field communication tag together with the second device are installed, may be enabled or even improved.

The pin of the near field communication tag may also be referred to as a field detection pin or FD pin. In particular, the near field communication tag may comprise a module for providing a functionality to provide or trigger the output signal at the FD pin. The module of the tag may for example derive the output signal depending on a state of the tag and the detection of a near field. Further, the output signal on the FD pin may then be used by the second device, for example as an interrupt source. The interrupt source may be received at the second device (host), i.e. to wake up an embedded microcontroller or trigger further actions in the second device. Typical applications may be Bluetooth and WiFi pairing with for example the first device or another device. Thereby, the behaviour of the FD pin (or the output signal) is configurable by the user (e.g. via the first tag interface or the second tag interface, in particular via a RF interface or a I2C interface) and a corresponding configuration may be stored in one or more FD pin configuration registers, as will be described below.

In the context of the present invention, a host or a host device may also be referred to as a second device being characterized at least by having a wire-based communication interface, i.e. a communication interface for wire-based communication. The wire-based communication may for example be compliant with I2C (inter-integrated circuit) which may relate to a multi-master serial single-added computer bus invented by Philips used for attaching low-speed peripherals to a motherboard, embedded system, cell phone or other electronic device. See for example www.wikipedia.org/wiki/i2c.

The first device may also refer to as a reader device or simply reader, which may in particular be adapted as a typical or even conventional radio frequency reader device also referred to as RF reader.

The near field communication tag may also be referred to as NFC tag or simply as tag. The near field communication tag, according to an embodiment of the present invention, may comply with specifications as set forth by the NFC forum which defines a type 1, type 2, type 3 or type 4 tag. Furthermore, the nearfield communication performed by the near field communication tag and the first device may comply with the NFC data exchange format technical specification, in particular version 1.0 as of 2006-07-24. Further details of the data exchange format specification and the specifications of the type 1 tag, the type 2 tag, the type 3 tag and the type 4 tag may be taken from the website http://www.nfc-forum.org/home/.

NFC Data Exchange Format (NDEF) Technical Specification specifies a common data format for NFC Forum-compliant devices and NFC Forum-compliant tags. NFC Forum Data Exchange Format is a lightweight binary message format designed to encapsulate one or more application-defined payloads into a single message construct. An NDEF message contains one or more NDEF records, each carrying a payload of arbitrary type and up to $2^{32}-1$ octets in size. Records can be chained together to support larger payloads. An NDEF record carries three parameters for describing its payload: the payload length, the payload type, and an optional payload identifier.

The NFC Forum has mandated four tag types to be operable with NFC devices. This is the backbone of interoperability between different NFC tag providers and NFC device manufacturers to ensure a consistent user experience. The operation specifications for the NFC Forum Type 1/2/3/4 Tags provide the technical information needed to implement the reader/writer and associated control functionality of the NFC device to interact with the tags. Type 1/2/3/4 Tags are all based on existing contactless products and are commercially available.

NFC Forum Type 1 Tag Operation Specification is based on ISO/IEC 14443A. Tags are read and re-write capable; users can configure the tag to become read-only. Memory availability is 96 bytes and expandable to 2 kbyte.

NFC Forum Type 2 Tag Operation Specification is based on ISO/IEC 14443A. Tags are read and re-write capable; users can configure the tag to become read-only. Memory availability is 48 bytes and expandable to 2 kbyte.

NFC Forum Type 3 Tag Operation Specification is based on the Japanese Industrial Standard (JIS) X 6319-4, also known as FeliCa. Tags are pre-configured at manufacture to be either read and re-writable, or read-only. Memory availability is variable, theoretical memory limit is 1 MByte per service.

NFC Forum Type 4 Tag Operation Specification 2.0 (November 2010) is fully compatible with the ISO/IEC 14443 standard series. Tags are pre-configured at manufacture to be either read and re-writable, or read-only. The memory availability is variable, up to 32 KBytes per service; the communication interface is either Type A or Type B compliant.

NFC Forum Connection Handover Technical Specification defines the structure and sequence of interactions that enable two NFC-enabled devices to establish a connection using other wireless communication technologies. Connection Handover combines the simple, one-touch set-up of NFC with high-speed communication technologies, such as WiFi or Bluetooth. The specification enables developers to choose the carrier for the information to be exchanged. If matching wireless capabilities are revealed during the negotiation process between two NFC-enabled devices, the connection can switch to the selected carrier. With this specification, other communication standards bodies can define information required for the connection setup to be carried in NFC Data Exchange Format (NDEF) messages. The specification also covers static handover, in which the connection handover information is stored on a simple NFC Forum Tag that can be read by NFC-enabled devices. Static mode is used in applications in which the negotiation mechanism or on-demand carrier activation is not required.

In particular the NFC tag according to embodiments of the present invention complies with at least one of:
NFC Forum "NFC Data Exchange Format (NDEF)" Technical Specification.
NFC Forum Technical Specification "Type 1 Tag Operational" v.1.1
NFC Forum Technical Specification "Type 2 Tag Operational" v.1.1
NFC Forum Technical Specification "Type 3 Tag Operational" v.1.1
NFC Forum Technical Specification "Type 4 Tag Operational" v.2.0
NFC Forum Technical Specification "Connection Handover" v1.2
NFC Forum, Bluetooth SIG Application Document "Bluetooth Secure Simple Pairing Using NFC"

According to other embodiments of the present invention the NFC tag additionally or alternatively complies with other versions of the above specifications or other specifications.

According to an embodiment of the present invention, when the detecting a near field indicates a transition from absence to presence of a near field, the output signal indicates one of the following: the tag is powered by the detected near field; the tag is powered by the detected near field and data via the near field are received; the tag is set to a selected state.

By this provision, the second device or any other device connected to the pin of the NFC tag may learn in which situation the NFC tag is currently in and will in particular learn about a characteristic of the near field communication tag regarding a near field which may be generated by the first device. Thereby, the second device may react accordingly, i.e. may wait a particular time interval after having learned that data are received via the near field at the NFC tag. The second device may for example wait until particular data have been received from the first device at the near field communication tag and the second device may then read or acquire the data (in particular first device data) later on.

Thereby, the second device may be enabled to perform further actions based on the first device data.

According to an embodiment of the present invention, when the detecting a near field indicates a transition from presence to absence of a near field, the output signal indicates one of the following: a previously detected near field disappeared; a previously detected near field disappeared or the tag is set to a halt state.

Again, the second device may learn about the state of the near field communication tag and may react accordingly. E.g., when the detected near field (close to the near field communication tag) disappeared, the second device is notified, that no further first device data are expected to be received at the near field communication tag. Further, if the near field communication tag is set to a halt state, the second device is thereby also notified that it is not expected that further first device data will be received at the near field communication tag.

According to an embodiment of the present invention, the configuration information is stored in the electronic storage using: a first pin configuration register associated with transitions from presence to absence of a near field; and a second pin configuration register associated with transitions from absence to presence of a near field.

The first pin configuration register may define the output signal when a transition from presence to absence of a near field is detected. The second pin configuration register may define the output signal, when a transition from absence to presence of a near field is detected. Thereby, a great flexibility is provided to define the configuration information and capture or support all or at least a number of important situations or use cases.

According to an embodiment of the present invention, the first pin configuration register and/or the second pin configuration register is/are writable via the first tag interface and/or the second tag interface. Thereby, the configuration information may be changeable by a user either via the first tag interface or the second tag interface. Thereby, a large flexibility is provided for customizing the configuration information. In other embodiments, some of the configuration registers may not be accessible or may at least not be writable via the first tag interface or the second tag interface, in order to protect for a change of potentially important configuration settings.

According to an embodiment of the present invention, the electronic storage further has a first register, in particular 1-bit register, for storing a first value indicating presence of the near field for the wireless near field communication as detected by the field detection section.

The first register may also be referred as RF_field_presence_indicator register thereby representing a register which indicates a presence (and absence) of a radio frequency field. If set to 1, it indicates that the field detection is on, vice versa if set to 0, it indicates that the field detection is off. This register may be read from the wired I2C interface, but not written.

According to an embodiment of the present invention, the first register is readable (e.g. by the second device) via the second tag interface but not writable.

Thereby, it may be prohibited, that the first register is erroneously changed or set via the second tag interface. In particular, the first register may be entirely controlled regarding the first value, by the near field communication tag.

According to an embodiment of the present invention, the electronic storage further has a second register, in particular 1-bit register, for storing a second value indicating enablement/disablement of the first tag interface.

The second register may also be referred to as RF_if_on_off register. If it set to 1, the RF interface is enabled, when it is set to 0, then the RF-interface (i.e. the first tag interface) is disabled, i.e. mute. The RF_if_on_off register may be read from the second device or host. In particular, the second register may be set, if the card (RF tag) is selected. The tag may be selected in a case where a plurality of tags are within a proximity of a near field generated by a reader device but only one of the tags is chosen by the reader, thereby selecting this particular tag. The second register is reset (set to 0), when no near field is detected or when the tag is in a halt state (e.g. a not selected state). The second register may neither be written to via the first tag interface nor by the second tag interface.

According to an embodiment of the present invention, the second register is readable (by the second device) via the second tag interface but not writable.

Thereby, it may be prohibited that the second value may be changed erroneously to a value not indicating the actual state of the enablement/disablement of the first tag interface.

According to an embodiment of the present invention, the tag is configured, to set the second value indicating enablement of the first tag interface, if the first value indicates presence of the near field and if the tag is in a selected state and wherein the tag is configured, to set the second value indicating disablement of the first tag interface, if the tag is not in a selected state (e.g. in a halt state).

Thereby, the near field communication tag may comprise a mechanism (or module) to automatically set the second value depending on a state of the tag and depending on the presence or absence of the near field. Thereby, the tag may be simplified and the second value may be derived in a simple manner.

According to an embodiment of the present invention, the second tag interface for wired communication complies with I2C. Further information regarding I2C may for example be taken from the Philips I2C reference manual as of the priority date of the present application.

According to an embodiment of the present invention, it is provided a second device, comprising a second device interface for wired communication with a near field communication tag; an interrupt input pin connectable to a pin of the near field communication tag, to receive an output signal generated by the near field communication tag upon a result of detecting a near field at the near field communication tag, wherein the second device is configured to trigger, depending on the received output signal, an action.

The second device may in particular be adapted to perform a wired communication with a near field communication tag as described in one of the preceding embodiments.

The second device may thus be adapted to receive or read the output signal generated by the near field communication tag via the interrupt input pin. The circuitry downstream the interrupt input pin may be sensitive to detecting an edge of a signal applied to the interrupt input pin such that a transition from a logical load to a logical high value or vice versa may be detected, triggering an action by the second device.

According to an embodiment of the present invention, it is provided a communication system, comprising a near field communication tag according to one of the embodiments described above; and a second device, in particular according to an embodiment as described above, connected to the near field communication tag via the second tag interface of the tag for wired communication.

In particular, the near field communication tag together with the second device may be installed in an appliance and the near field communication tag and the second device may have a fixed connection using the second tag interface for the wired communication.

It should be noted that features which are individually or in any combination described, provided for or applied for a near field communication tag, or a communication system may also be applied for a method for communication according to an embodiment of the present invention and vice versa.

The communication system may further comprise a first device capable of generating a near field and having a first device interface for wireless near field communication with the near field communication tag.

According to an embodiment of the present invention, it is provided a method performed by the communication system according to an embodiment described above, comprising generating a near field by the first device; arranging the first device and the near field communication tag such that the near field communication tag detects the near field; generating, by the near field communication tag, an output signal at the pin of the near field communication tag, the output signal indicating that the tag is powered by the detected near field and first device data via the near field are received at the near field communication tag; receiving the output signal at the second device; receiving, at the tag via the first tag interface, the first device data from the first device by near field communication; reading, by the second device, the received first device data from the tag.

BRIEF DESCRIPTION OF THE DRAWINGS

The invention will be described in more detail hereinafter with reference to examples of embodiment but to which the invention is not limited.

The FIGURE schematically illustrates a communication system according to an embodiment of the present invention including a near field communication tag according to an embodiment of the present invention, a second device according to an embodiment of the present invention and a first device.

DESCRIPTION OF EMBODIMENTS

The communication system 100 illustrated in the FIGURE according to an embodiment of the present invention includes a near field communication tag 101 according to an embodiment of the present invention, a second device 103 according to an embodiment of the present invention and a first device 105.

The near field communication tag 101 comprises a first tag interface 107 for a wireless near field communication, via a near field 109, with a first device 105, for which the first device 105 has a first device interface 111 for wireless near field communication with the near field communication tag 101 via its first tag interface 107. The near field communication tag 101 further comprises a second tag interface 113 for a wired communication with the second device 103, wherein for this wired communication a communication cable 115 connects the second tag interface 113 of the near field communication tag 101 with a second device interface 117 of the second device 103. The near field communication tag 101 further comprises a field detection section 119 for detecting a near field 109 for the wireless near field communication between the near field communication tag 101 and the first device 105 which may for example a RF reader device. Further, the near field communication tag 101 comprises a pin 121 (e.g. embodied as a terminal which may be accessible from outside the NFC tag 101) which is connectable and in the illustrated example connected to the interrupt input pin 123 of the second device 103. Thereby, the NFC tag 101 is adapted to determine an output signal 127 which is provided at the pin 121 based on a result of the detecting a near field. Further, the NFC tag comprises an electronic storage 125 for storing pin configuration information specifying the output signal 127 which is provided to the pin 121. In particular, the pin configuration information is stored in a first pin configuration register 129 and in a second pin configuration register 131.

Field detection (FD) may work as follows:

The FD functionality shall trigger an output signal on the FD pin that can be used as interrupt source to the Host e.g. to wake up an embedded microcontroller or trigger further actions. Typical applications are Bluetooth and Wi-Fi pairing.

The behaviour of the FD pin shall be user configurable (via the RF or I²C interface) and shall be stored in FD configuration registers.

According to the FD registers the FD pin shall behave as follows:

| FD transition OFF→ON | | FD transition ON→OFF | |
|---|---|---|---|
| 0 | If the NFC Forum Tag is powered by an external RF field | 0 | If the external RF field is switched off |
| 1 | If the NFC Forum Tag is powered by an external RF field and a valid start of frame sequence has been detected | 1 | If the external RF field is switched off or the NFC Forum tag is set to HALT state |
| 2 | If the NFC Forum Tag is set to the SELECTED state | | |

The status of the FD pin shall be stored in the RF_FIELD_PRESENCE_INDICATOR register.

RF_FIELD_PRESENCE_INDICATOR register depends on the FD pin settings. If set to 1 it indicates that the FD is ON, vice versa if set to 0 it indicates that the FD is OFF. This register can be read from the wired I2C interface, but not written.

RF_IF_ON_OFF register: if set to 1 the RF Interface is enabled, when reset to 0 the RF Interface is disabled i.e. mute. This register can be read. More in detail, the register is set if card is selected and reset when no field or card into HALT. No direct write via the interfaces is possible.

Thereby, the first pin configuration register 129 may be a 2-bit register and the second pin configuration register 131 may for example be a 1-bit register. The pin configuration registers 129, 131 may be writable via the first tag interface 107 and/or the second tag interface 113, thus may be writable either by the second device 103 or the first device 105, via a wire-based and a wireless communication methodology, respectively.

Further, the electronic storage 125 of the NFC tag 101 comprises a first register 133 for storing a first value indicating presence of the near field 109 as detected by the field detection section 119. This first register 133 is readable via the second tag interface 113 but is not writable. Thus, the contents of the first register 133 may be read from the second device 103 but may not be written. Further, the electronic storage 125 comprises a second register 135 for storing a second value indicating enablement/disablement of the first tag interface 107. Thereby, the second register is readable via the second tag interface 113 but is not writable. Thus, the second device 103 may read the content or the second value from the second register 135 but may not write to it.

Further, the NFC tag 101 has the functionality, to set the second value such as to indicate an enablement of the first tag interface 107, if the first value in the first register 133 indicates the presence of the near field 109 and if the tag is in a selected state which may for example be indicated in a state register 137. The state register may for example indicate a selected state or a halt state, wherein these states are indicated depending on whether the first device 105 has selected the NFC tag 101 or not. The selection or putting the NFC tag 101 in a select state or in a halt state is known to the skilled person.

According to an embodiment of the present invention, the communication using the wired communication via the communication cable 115 complies with I2C.

The invention may, according to an embodiment of the present invention, comprise the following features:

1) a programmable field detection (FD) pin, i.e. the terminal 121

2) a register (i.e. the first register 133) to inform about the presence of the external RF field 109 and 3) a register, i.e. the second register 135, to inform about the enablement/disablement of the RF interface, i.e. the first tag interface 107.

According to an embodiment of the present invention, the NFC tag 101 may have a fixed connection via the communication cable 115 to the second device 103 and the NFC tag 101 together with the second device 103 may be installed in an appliance such as a printer or another device which may be capable for establishing a Bluetooth or WiFi connection session with another device, such as with the first device 105 for which the first device may comprise an appropriate interface 139 which may for example be adapted to communicate via Bluetooth or WiFi. In the illustrated example, the NFC tag 101 and the second device 103 are installed in the appliance 141 (i.e. a printer or a computer, such as a desktop computer, or a mobile computer) which has an interface 143 corresponding to the interface 139 of the first device 105 such that a communication channel 145, such as a Bluetooth channel or WiFi channel, may be established between the first device 105 and the appliance 141.

The communication system 100 illustrated in the FIGURE may perform a method according to an embodiment of the present invention involving the first device 105, the NFC tag 101 and the second device 103. In a first step, the first device 105 may generate a near field 109 while in proximity to the NFC tag 101. Alternatively, the first device and the NFC tag 101 may be arranged close to each other such that the near field communication tag 101 detects the near field 109 via its first tag interface 107 and its field detection section 119. Further, upon detection of the near field 109, the NFC tag 101 generates an output signal 127 at the pin 121, wherein the output signal 127 indicates that the NFC tag 101 is powered by the detected near field 109 and that first device data (or at least a portion thereof, e.g. a start portion) 147 are received at the near field communication tag 101 where they may be stored within the electronic storage 125, in particular in a region or storage area which may be readable by the second device 103 via the communication cable 115, i.e. via the wire-based communication channel. The output signal 127 generated at the pin 121 by the NFC tag 101 is received at the second device 103 via the interrupt input terminal 123. Thereby, the second device 103 is notified that a RF communication is ongoing between the NFC tag 101 and the first device 105, which may be a reader device.

In particular, the first device data 147 may comprise some configuration data which may be required by the appliance 141, in particular the interface 143, in order to establish the communication channel 145 which is intended to be created. The first device data 147 are received via the first tag interface 107 at the NFC tag 101 and stored within the electronic storage 125. After e.g. having waited a particular time interval after having received the output signal 127 (indicating that an RF communication is going on between the first device 105 and the NFC tag 101), the second device 103 reads, via the second device interface 117, the wire-based communication cable 115 and the second tag interface 113 the first device data 147 (or data derived therefrom, i.e. reformatted etc) which have been stored at the electronic storage 125 of the NFC tag. Further, the interface 143 of the appliance 141 (in which the second device 103 and the NFC tag 101 are installed) receives the first device data 147 (or data derived therefrom, i.e. in a different format, or stripped of particular portions) and uses these data for configuring itself for establishing the communication channel 145 to the first device 105, via the appropriate interface 139 of the first device 105.

A use case involving embodiments of the present invention could comprise the configuration of a printer in the factory just before packaging where the printer at the end of the assembly line is passing an NFC-reader by which the printer configuration data is transferred via the near field to the non-volatile memory of the tag according to an embodiment of the present invention (the printer may not be powered at that time). When the customer unpacks the printer at home and switches it on for the first time, the memory of the tag is read by the host (within the printer), the printer is configured according to contents in the non-volatile memory of the tag and the customer can use the printer in the configuration he paid for (e.g. at a low price the printer is not enabled for duplex (both page-sides) printing.

Another use case may be a mechanism to transfer electronic data, such as photos from a mobile phone to a computing device, such as a desktop computer, a laptop computer, a tablet computer or the like. In this scenario, a first device, i.e. a RF reader may also be installed at the mobile phone, while the NFC tag together with the second device (host) may be installed in the computing device. Similarly, the mobile phone may be placed in proximity to the computing device upon which an RF communication channel is established which may transfer some Bluetooth or WiFi configuration data from the mobile phone to the tag via the wireless communication. Further, via the wire-based communication, the second device (host) also installed in the computing device may read the Bluetooth/WiFi-configuration data from the NFC tag and may use these to configure a Bluetooth/WiFi communication interface within the computing device. Once the Bluetooth/WiFi communication interface in the computing device is configured, a Bluetooth communication session between the mobile phone and the computing device may be established and the electronic data, such as the camera images, may be transferred from the mobile phone to the computing device via Bluetooth/WiFi.

Thus, embodiments of the present invention enable a fast setup of a communication using high-speed communication technology originally using near field communication technology.

The invention claimed is:

1. Near field communication tag, comprising:
a first tag interface for wireless near field communication with a first device;
a second tag interface for wired communication with a second device;
a field detection section for detecting a near field for the wireless near field communication;
a pin connectable to the second device, wherein an output signal is determined based on a result of the detecting of a near field and the output signal is provided to the pin; and
an electronic storage storing pin configuration information specifying the output signal.

2. Tag according to claim 1, wherein, when the detecting a near field indicates a transition from absence to presence of a near field, the output signal indicates one of the following:
the tag is powered by the detected near field;
the tag is powered by the detected near field and first device data via the near field are received;
the tag is set to a selected state.

3. Tag according to claim 1, wherein, when the detecting a near field indicates a transition from presence to absence of a near field, the output signal indicates one of the following:
a previously detected near field disappeared;
a previously detected near field disappeared or the tag is set to a halt state.

4. Tag according to claim 1, wherein the configuration information is stored in the electronic storage using:
a first pin configuration register associated with transitions from presence to absence of a near field; and
a second pin configuration register associated with transitions from absence to presence of a near field.

5. Tag according to claim 4, wherein the first pin configuration register and/or the second pin configuration register are writable via the first tag interface and/or the second tag interface.

6. Tag according to claim 1, wherein the electronic storage further has a first register, in particular 1-bit register, for storing a first value indicating presence of the near field for the wireless near field communication as detected by the field detection section.

7. Tag according to claim 6, wherein the first register is readable, in particular by the second device, via the second tag interface but not writable.

8. Tag according to claim 1, wherein the electronic storage further has a second register, in particular 1-bit register, for storing a second value indicating enablement/disablement of the first tag interface.

9. Tag according to claim 8, wherein the second register is readable, in particular by the second device, via the second tag interface but is not writable via the second tag interface and is not writable via the first interface.

10. Tag according to claim 8,
wherein the tag is configured, to set the second value indicating enablement of the first tag interface, if the first value indicates presence of the near field and if the tag is in a selected state and
wherein the tag is configured, to set the second value indicating disablement of the first tag interface, if the tag is not in the near field or is in the halt state.

11. Tag according to claim 1, wherein the second tag interface for wired communication complies with I2C.

12. Second device, comprising: a second device interface for wired communication with a near field communication tag according to claim 1; an interrupt input pin connectable to a pin of the near field communication tag, to receive an output signal generated by the near field communication tag upon a result of detecting a near field at the near field communication tag, wherein the second device is configured to trigger, depending on the received output signal, an action.

13. Communication system, comprising:
a near field communication tag according to claim 1,
wherein the second device comprises a second device interface for wired communication with the near field communication tag, wherein the second device is connected to the near field communication tag via the second tag interface of the tag for wired communication.

14. Communication system according to claim 13,
wherein the first device is for generating a near field, wherein the first device comprises a first device interface for wireless near field communication with the near field communication tag.

15. Method performed by the communication system according to claim 14, comprising:
generating a near field by the first device;
arranging the first device and the near field communication tag such that the near field communication tag detects the near field;
generating, by the near field communication tag, an output signal at the pin of the near field communication tag, the output signal indicating that the tag is powered by the detected near field and that first device data via the near field are received at the near field communication tag;
receiving the output signal at the second device;
receiving, at the tag via the first tag interface, the first device data from the first device by near field communication;
reading, by the second device, the received first device data from the tag.

* * * * *